US010762705B2

(12) United States Patent
Bachrach et al.

(10) Patent No.: US 10,762,705 B2
(45) Date of Patent: Sep. 1, 2020

(54) TECHNIQUES FOR CREATING POP-UP CARDS FROM 3D MODELS

(71) Applicant: AUTODESK, INC., San Rafael, CA (US)

(72) Inventors: Johnathan Bachrach, Berkeley, CA (US); Saul Griffith, San Francisco, CA (US)

(73) Assignee: AUTODESK, INC., San Rafael, CA (US)

( * ) Notice: Subject to any disclaimer, the term of this patent is extended or adjusted under 35 U.S.C. 154(b) by 656 days.

(21) Appl. No.: 13/740,093

(22) Filed: Jan. 11, 2013

(65) Prior Publication Data
US 2013/0191083 A1 Jul. 25, 2013

Related U.S. Application Data

(60) Provisional application No. 61/586,537, filed on Jan. 13, 2012.

(51) Int. Cl.
*G06F 17/50* (2006.01)
*G06T 19/00* (2011.01)

(52) U.S. Cl.
CPC ........ *G06T 19/00* (2013.01); *G06T 2219/008* (2013.01)

(58) Field of Classification Search
CPC .................................................... G06T 19/00
See application file for complete search history.

(56) References Cited

U.S. PATENT DOCUMENTS

| | | | |
|---|---|---|---|
| 4,349,973 A | 9/1982 | Penick et al. | |
| 5,317,823 A | 6/1994 | Brunt, II | |
| 5,450,680 A | 9/1995 | Bromberg | |
| 5,657,875 A | 8/1997 | Hirsh, III et al. | |
| 5,758,438 A | 6/1998 | Crowell | |
| 5,864,973 A | 2/1999 | Cole | |
| 5,933,989 A | 8/1999 | Volkert et al. | |
| 5,943,800 A | 8/1999 | Rose | |
| 5,983,538 A * | 11/1999 | Crowell | G09F 1/08 40/124.14 |
| 6,173,515 B1 | 1/2001 | Walsh | |
| 6,311,142 B1 * | 10/2001 | Glassner | 703/1 |

(Continued)

OTHER PUBLICATIONS

Glassner, Andrew. "Interactive pop-up card design. 1." Computer Graphics and Applications, IEEE 22.1 (2002): 79-86.*

(Continued)

*Primary Examiner* — Rehana Perveen
*Assistant Examiner* — Cuong V Luu
(74) *Attorney, Agent, or Firm* — Artegis Law Group, LLP

(57) ABSTRACT

One embodiment of the invention is a pop-up engine that generates a pop-up card from a sliced 3D graphics model. In operation, the pop-up engine processes a sliced 3D model to identify locations where the sliced 3D model is to attach to a plane surface of a pop-up card. For a given set of slices associated with a sliced 3D model, the pop-up engine identifies at least two slices that intersect at a folding line of the plane surface. The pop-up engine then identifies locations on the slices that are the farthest from the folding line. The pop-up engine marks the identified locations as connection points, where the 3D model is to attach to the plane surface.

22 Claims, 9 Drawing Sheets

(56) References Cited

U.S. PATENT DOCUMENTS

| | | | |
|---|---|---|---|
| 6,311,418 B1* | 11/2001 | Crowell | G09F 1/08 |
| | | | 283/117 |
| 6,643,962 B1 | 11/2003 | Panec et al. | |
| 6,725,588 B1 | 4/2004 | Swoboda | |
| 6,877,263 B2 | 4/2005 | Clark | |
| 6,966,135 B1 | 11/2005 | McDonald | |
| D555,211 S | 11/2007 | Knight et al. | |
| 7,618,301 B2 | 11/2009 | Knight et al. | |
| 7,753,753 B2 | 7/2010 | Payne et al. | |
| 7,836,620 B2 | 11/2010 | Cole | |
| 8,336,238 B1 | 12/2012 | Hines | |
| 2003/0097773 A1 | 5/2003 | Oh | |
| 2003/0230012 A1* | 12/2003 | Mouyal | G09F 1/06 |
| | | | 40/124.08 |
| 2004/0083631 A1 | 5/2004 | Zakova et al. | |
| 2004/0222549 A1 | 11/2004 | Sano et al. | |
| 2005/0132621 A1 | 6/2005 | Bostick, II | |
| 2012/0158369 A1* | 6/2012 | Bachrach | G06F 17/50 |
| | | | 703/1 |
| 2012/0285861 A1 | 11/2012 | Glass et al. | |
| 2013/0139420 A1 | 6/2013 | Rubar | |

OTHER PUBLICATIONS

Glassner, Andrew. "Interactive pop-up card design. 2." Computer Graphics and Applications, IEEE 22.2 (2002): 74-85.*

Marsan, Anne, et al. "An assessment of data requirements and data transfer formats for layered manufacturing." NIST, US Department of Commerce (1998).*

Jun Automatic Paper Pop-Up Design School of Computing National University of Singapore, 2010.*

Okamura et al. An Interface for Assisting the Design and Production of Pup-Up Card SG 2009, LNCS 5531, pp. 68-78.*

Non-Final Office Action for U.S. Appl. No. 13/740,097 dated Oct. 12, 2016.

Final Office Action for U.S. Appl. No. 13/740,097 dated Sep. 23, 2015.

Non-Final Office Action for U.S. Appl. No. 13/740,097 dated Apr. 20, 2015.

Glassner, "Interactive pop-up card design. 1", Computer Graphics and Applications, IEEE 22.1. 2002 pp. 79-86.

Glassner, "Interactive pop-up card design. 2", Computer Graphics and Applications, IEEE 22.2, 2002, pp. 74-85.

Marsan, et al., "An assessment of data requirements and data transfer formats for layered manufacturing", NIST, US department of Commerce, 1998.

Final Office Action received for U.S. Appl. No. 13/740,097, dated Mar. 24, 2017, 30 pages.

Non-Final Office Action received for U.S. Appl. No. 13/740,097, dated Dec. 22, 2017, 22 pages.

Final Office Action received for U.S. Appl. No. 13/740,097, dated May 14, 2018, 25 pages.

Non-Final Office Action received for U.S. Appl. No. 13/740,097, dated Dec. 18, 2018, 18 pages.

Notice of Allowance received for U.S. Appl. No. 13/740,097, dated Jun. 13, 2019, 25 pages.

* cited by examiner

TECHNIQUES FOR CREATING POP-UP CARDS FROM 3D MODELS

CROSS-REFERENCE TO RELATED APPLICATIONS

This application claims priority to U.S. Provisional Patent Application Ser. No. 61/586,537, filed Jan. 13, 2012, entitled "Pop Up Cards," which is hereby incorporated herein by reference.

BACKGROUND OF THE INVENTION

Field of the Invention

Embodiments presented in this disclosure generally relate to computer aided design (CAD) and computer aided manufacturing (CAM). More specifically, embodiments presented herein provide a techniques for pop-up cards from three-dimensional (3D) models.

Description of the Related Art

Pop-up cards are cards that, once fully opened, include a 3D structure that protrudes outward from the card, giving the card a 'pop out' effect. The 3D structures on the pop-up card are constructed by cutting and scoring two-dimensional material. The design of the 3D structure allows from the structure to be collapsed when the pop-up card is fully closed.

Determining an optimal location for placing the structure on the pop-up card such that the structure collapses and expands easily is a tedious and error prone task that is highly dependent on the design of the 3D structure. Further, manually determining the design of the 3D structure that allows for the structure to be collapsed and expanded is a complicated task. Therefore, pop-up cards are usually extremely difficult to make.

As the foregoing illustrates, what is needed in the art is a more effective approach for designing pop-up cards.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

SUMMARY

Embodiments presented herein provide techniques for a computer-implemented method for generating a pop-up card based on a three-dimensional (3D) graphics model. The method includes the steps receiving an orientation of the 3D model on a plane surface having a fold line along which the plane surface folds, slicing the 3D graphics model along at least two slice axes to generate a plurality of slices, identifying a first slice included in the plurality of slices that intersects a second slice included in the plurality of slices at the fold line, identifying a connection location along the first slice where the first slice is to attach to the plane surface, and causing an indication of the connection location to be generated on the first slice when the first slice is manufactured.

One advantage of the disclosed techniques is that, given a 3D model, the structure of a pop-up card that includes that 3D model is automatically determined. Pop-up cards can, thus, be designed and produced efficiently.

DETAILED DESCRIPTION

Figure 1:
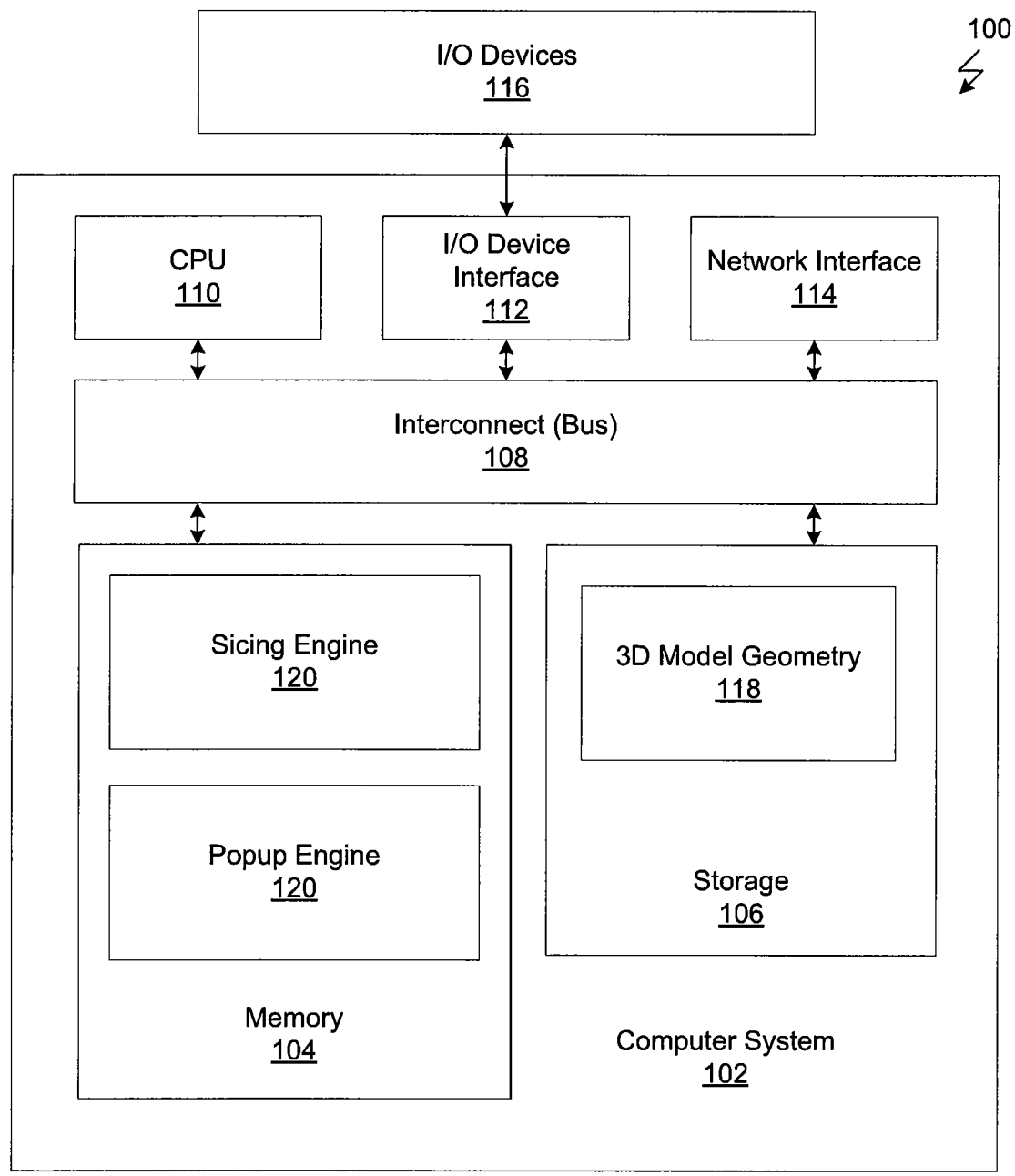
FIG. 1 illustrates an example system configured to create a pop-up card from a 3D model, according to one embodiment of the invention.

FIG. 1 illustrates an example system 100 configured to slice create a pop-up card from a 3D model, according to one embodiment of the invention. As shown, the computing system 100 includes, without limitation, a computer system 102 and input/output (I/O) devices 116. The computer system 102 includes a memory 102, storage 106, a central processing unit (CPU) 110, an I/O device interface 112, a network interface 114 and a bus 108. The I/O device interface 112 interfaces with the I/O devices 116 (e.g., keyboard, display and mouse devices).

CPU 110 retrieves and executes programming instructions stored in the memory 102. Similarly, CPU 110 stores and retrieves application data residing in the memory 102. The bus 108 transmits programming instructions and application data between the CPU 110, I/O devices interface 112, storage 106, network interface 114 and memory 102. CPU 110 is included to be representative of a single CPU, multiple CPUs, a single CPU having multiple processing cores, and the like. And the memory 102 is generally included to be representative of a random access memory. The storage 106 may be a disk drive storage device. Although shown as a single unit, the storage 106 may be a combination of fixed and/or removable storage devices, such as magnetic disc drives, solid state drives (SSD), removable memory cards, optical storage, network attached storage (NAS), or storage volumes mounted over a storage area-network (SAN), etc.

As shown, the memory 102 includes a slicing engine 120 and a popup engine 122. The slicing engine 120 slices 3D models based on one or more slice axes. Different slices of the sliced model are connected to reconstruct the 3D model. The pop-up engine 122 processes sliced 3D models and determines how such sliced 3D models are to attach to plane surfaces to create pop-up cards.

In operation, a user selects a plane surface and a pre-defined 3D model, such as the 3D model represented by the 3D geometry 118 stored in storage 106, for attaching to the surface. The surface includes a folding line indicating the line along which the surface is to fold to form a card. The selections of the plane surface and the pre-defined 3D model are transmitted to the pop-up engine 122. In one embodiment, the user orients the 3D model on the plane surface. In alternative embodiments, the pop-up engine determines an orientation of the 3D model on the plane surface based on the size of the 3D model and the location of the folding line.

The pre-defined 3D model is checked for validity. If parts of the geometry are invalid, the user is alerted to the specific problem, and its location is highlighted. Such problems can then be fixed in a 3D modeling tool. The user can rotate and scale the 3D model, or scale individual components. Additional support structures can be generated by extruding the outline of the 3D model onto the plane surface, in order to allow for floating or overhanging structures.

The pop-up engine 122 then determines one or more axes (referred to herein as the "set of slice axes") along which the 3D model is to be sliced. In one embodiment, the user provides the axes along which the 3D model is to be sliced. In one embodiment, the user provides other parameters, including the number of slices and attachment points. In alternative embodiments, the pop-up engine 122 computes the axes along which the 3D model is to be sliced based on the orientation of the 3D model on the plane surface. Once the set of slice axes are determined, the pop-up engine 122 transmits the 3D model and the set of slice axes to the slicing engine 120.

In response, the slicing engine 120 slices the 3D model based on the set of slice axes to generate a set of slices associated with the 3D model. Each slice associated with the 3D model connects to at least one other slice to reconstruct the 3D model. In one embodiment, where the set of slice axes includes only one slice axis, the slicing engine performs one-way slicing of the 3D model such that each slice associated with the 3D model is orthogonal to the slice axis and of equal width. In an alternative embodiment, where the set of slice axes includes two slice axes, the slicing engine performs two-way slicing of the 3D model. A subset of the slices associated with the 3D model that is two-way sliced is orthogonal to a first slice axes and a subset of the slices associated with the 3D model is orthogonal to a second slice axes. The slices in the two subsets interconnect to reconstruct the 3D model.

The slicing engine 120 transmits a representation of the sliced 3D model to the pop-up engine 122. The pop-up engine 122 then identifies locations on one or more of the set of slices associated with the 3D model where those slices are to attach to the plane surface selected by the user. The techniques implemented by the slicing engine 120 for determining attachment locations for a two-way sliced 3D model are described in more detail in FIGS. 2-7.

Figure 2:
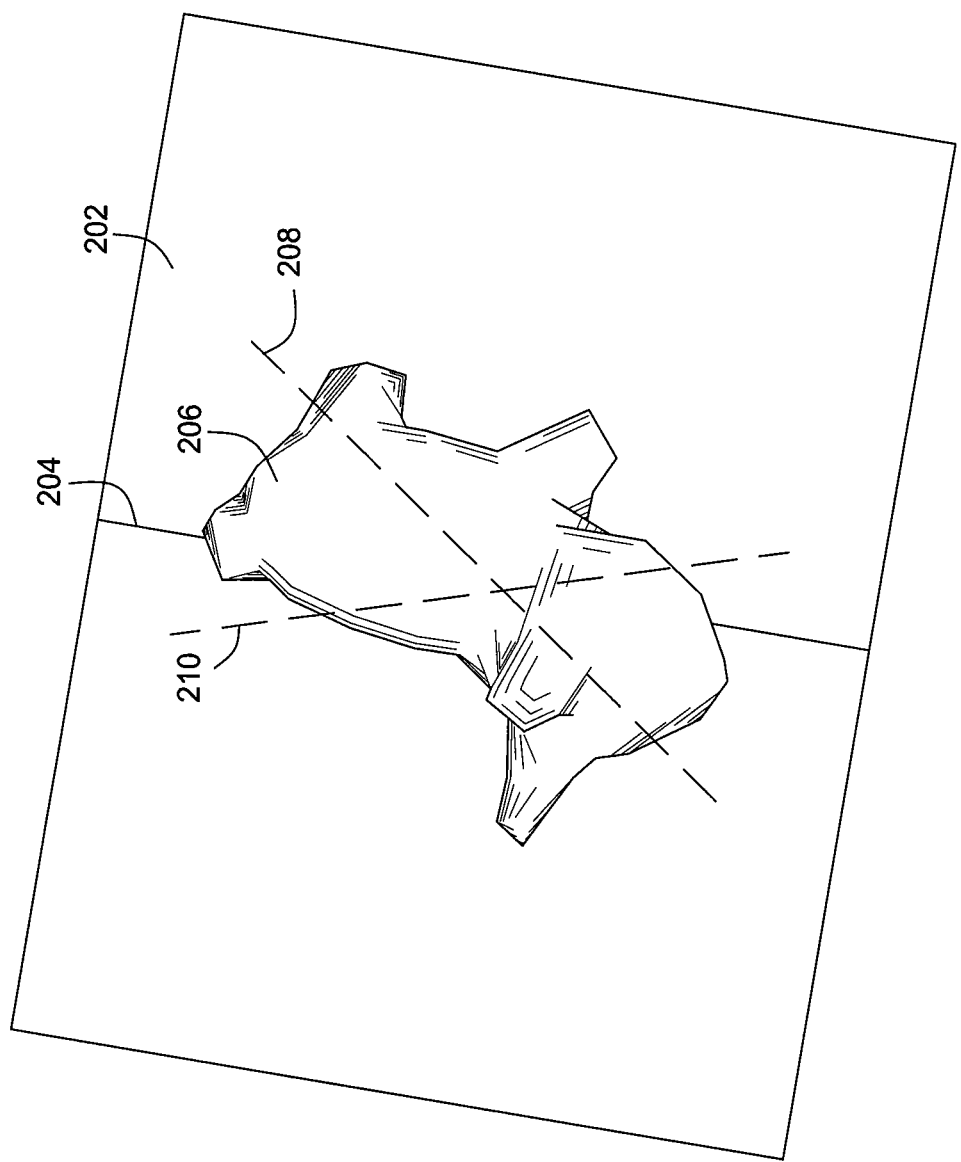
FIG. 2 illustrates a 3D model oriented on a plane of a pop-up card, according to one embodiment of the invention.

FIG. 2 illustrates a 3D model 206 oriented on a plane 202 of a pop-up card, according to one embodiment of the invention. As shown, the plane 202 includes a folding line 204 along which the plane is to be folded. The 3D model 206 is oriented on the plane 202 such that the 3D model 206 intersects the folding line 204. As discussed above, in one embodiment, the user orients the 3D model on the plane surface. In alternative embodiments, the pop-up engine determines an orientation of the 3D model on the plane surface based on the size of the 3D model and the location of the folding line. The pop-up engine 122 determines based on the orientation of the 3D model 206 on the plane 202 that the 3D model 206 is to be sliced along two axes, slice axis 208 and slice axis 210. The pop-up engine 122 transmits the 3D model 206, the slice axis 208 and the slice axis 210 to the slicing engine 120 for slicing, as discussed above.

Figure 3:
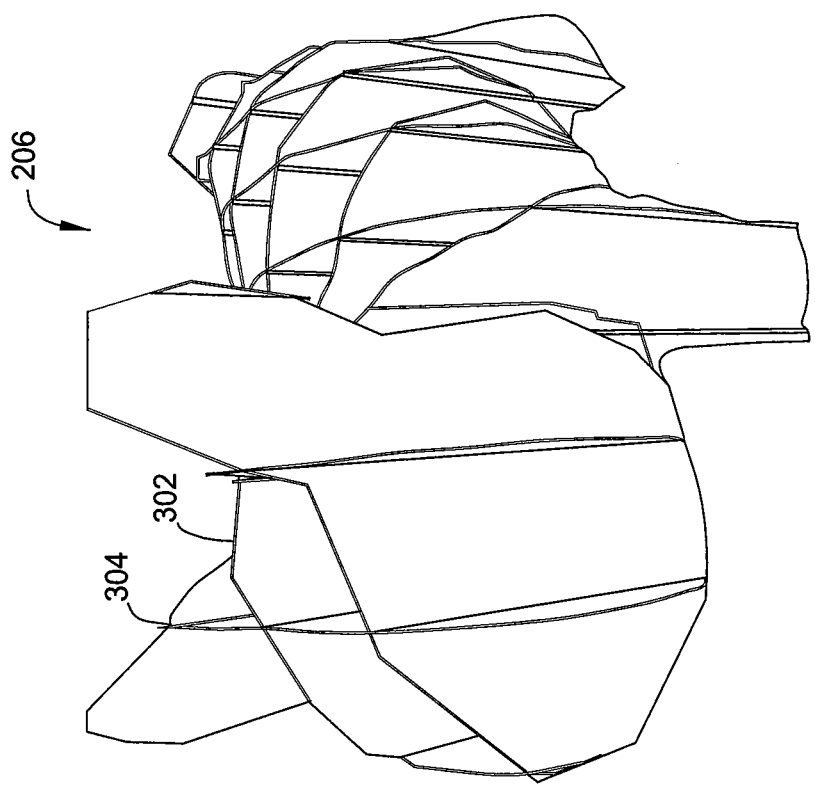
FIG. 3 illustrates the 3D model sliced along two axes, according to one embodiment of the invention.

FIG. 3 illustrates the 3D model 206 sliced along two axes, according to one embodiment of the invention. As discussed above, the slicing engine 120 slices the 3D model 206 first along slice axis 208 and then along slice axis 210. The slices that are generated, such as slice 304 and slice 302, interconnect to reconstruct the 3D model 206, as shown. The slicing engine 120 transmits the sliced 3D model 206 to the pop-up engine 122 for further processing.

Figure 4A:
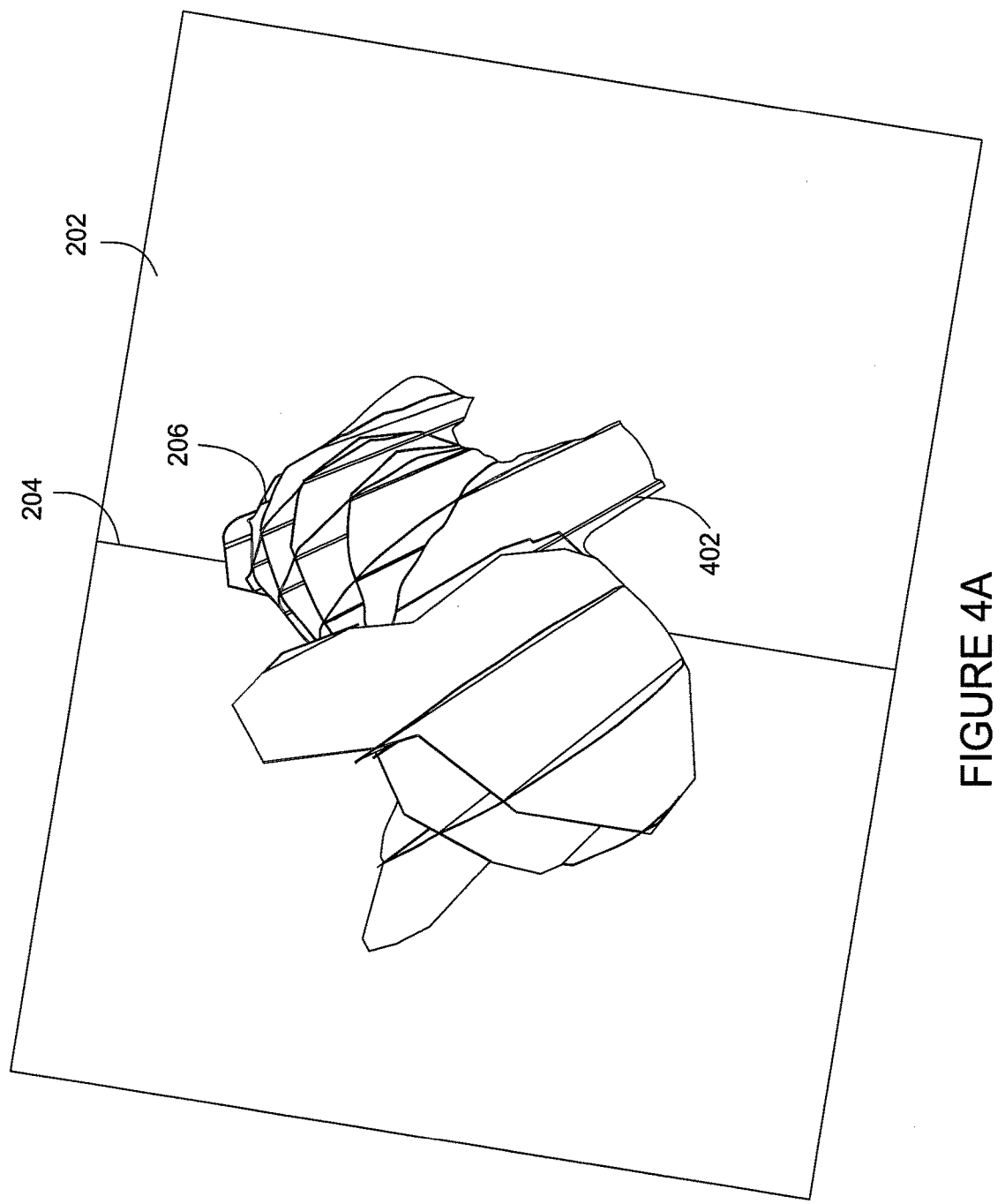
FIG. 4A illustrates the sliced 3D model attached to the plane of FIG. 2, according to one embodiment of the invention.

FIG. 4A illustrates the sliced 3D model 206 attached to the plane 202 of FIG. 2, according to one embodiment of the invention. In operation, the pop-up engine 122 receives the sliced 3D model 206 from the slicing engine 120 and places the sliced 3D model 206 onto the plane 202. In one embodiment, the pop-up engine 122 places the sliced 3D model 206 at such an orientation that the slices of the 3D model are diagonal to the folding line 204.

Once the sliced 3D model 206 is oriented on the plane 202, the pop-up engine 122 identifies two attachment slices of the 3D model 206 that intersect at the fold line 204. On each attachment slice, such as attachment slice 402, the pop-up engine 122 identifies a location that is closest to the plane 202 and farthest from the folding line 204. The pop-up engine 122 marks each of the identified locations as attachment locations, where the 3D model 206 attaches to the plane 202. In one embodiment, the pop-up engine 122 modifies each attachment slice to include a tab portion. When the attachment slices with the tab portions are manufactured, the tab portion slides into a slot that is cut into the physical pop-up card.

Figure 4B:
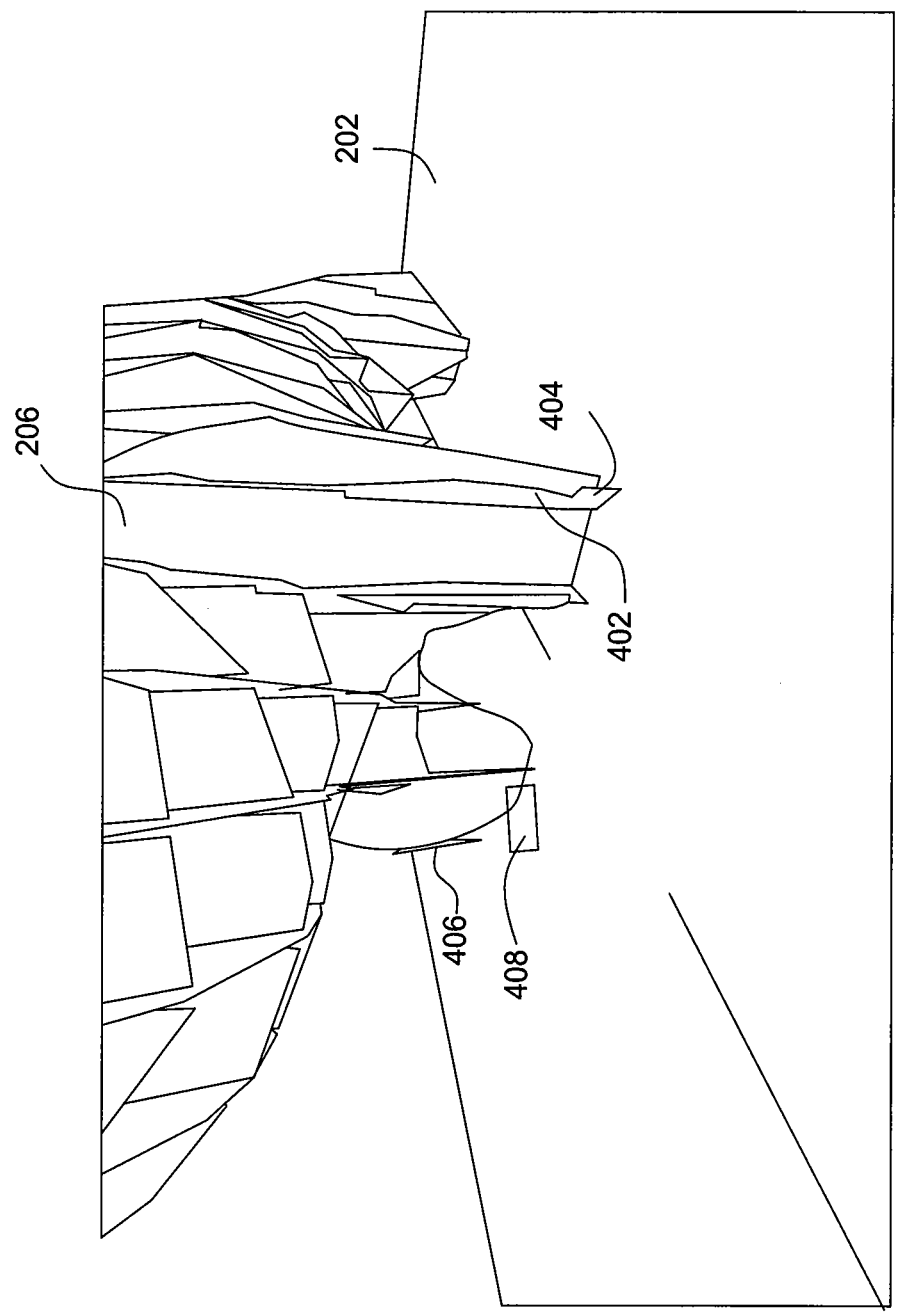
FIG. 4B illustrates a more detailed view of the sliced 3D model attached to the plane of FIG. 2, according to one embodiment of the invention.

FIG. 4B illustrates a more detailed view of the sliced 3D model 206 attached to the plane 202 of FIG. 2, according to one embodiment of the invention. The pop-up engine 122 identifies slice 402 and slice 406 as attachment slices that intersect at the folding line 204. The pop-up engine 122 then modifies the slice 402 to include an attachment point, i.e., tab 404, at the location on the slice 402 farthest from the folding line 204 and closest to the plane 202. Similarly, pop-up engine 122 modifies the slice 406 to include an attachment point, i.e., tab 408, at the location on the slice 406 farthest from the folding line 204 and closest to the plane 202. When the sliced 3D model 206 is manufactured, the tabs 404 and 408 slide into slots cut into a physical pop-up card.

Figure 4C:
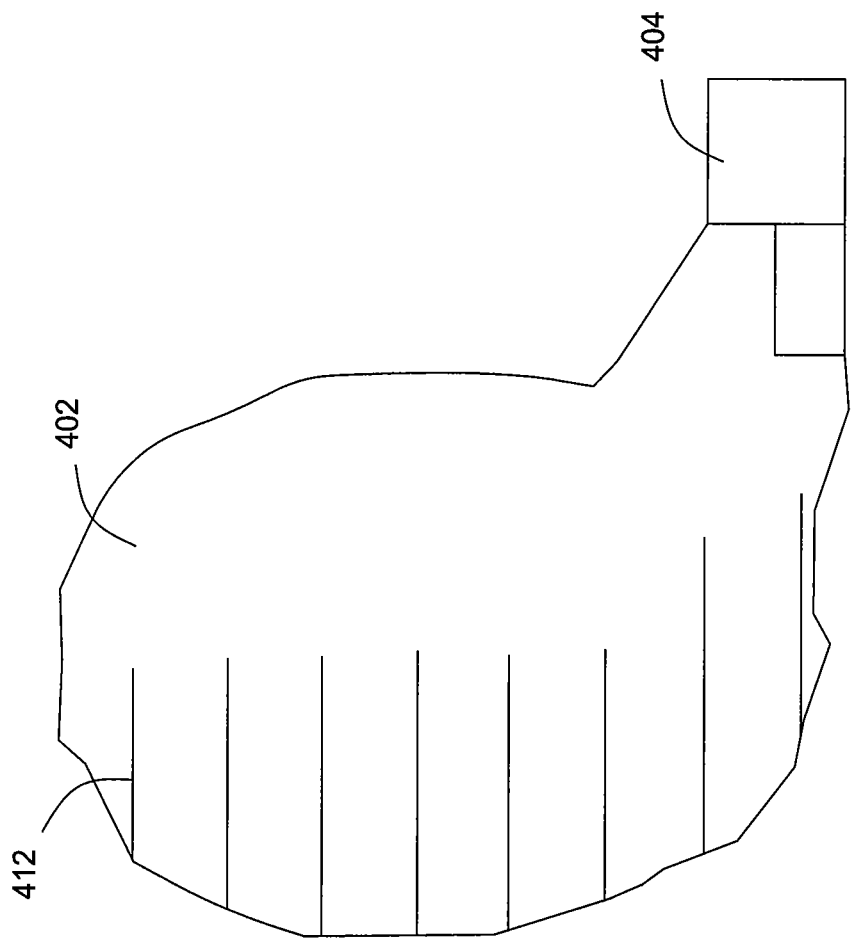
FIG. 4C illustrates a detailed view of a slice of the 3D model that attaches to the plane of FIG. 2, according to one embodiment of the invention.

FIG. 4C illustrates a detailed view of the attachment slice 402 of FIG. 4 that attaches to the plane of FIG. 2, according to one embodiment of the invention. As shown, the attachment slice includes tab portion 404 and a set of slots, such as slot 412. Each slot in the set of slots intersects with and slides in to a slot included in a different slice of the 3D model 206. For example, when the slices of the 3D model 206 are attached, slot 412 slides in to a corresponding slot included in attachment slice 406.

Figure 5:
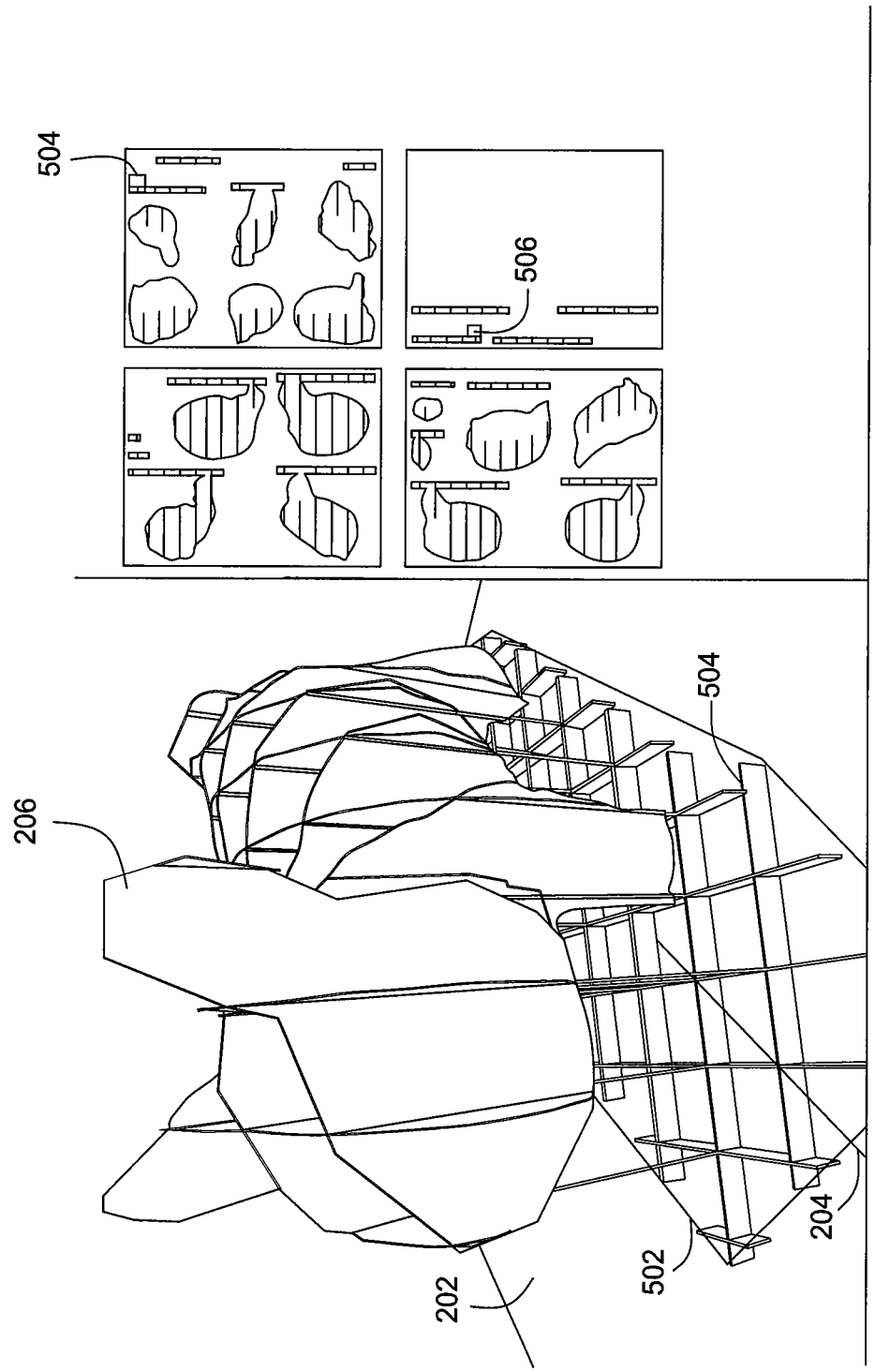
FIG. 5 illustrates the sliced 3D model attached to the plane of FIG. 2 via a base, according to one embodiment of the invention.

FIG. 5 illustrates the sliced 3D model 206 attached to the plane 202 of FIG. 2 via a base 502, according to one embodiment of the invention. As shown, the sliced model 206 is placed on a base 502, and the base 502 is then attached to the plane 202.

In operation, the pop-up engine 122 identifies two attachment slices of the base 502 that intersect at the fold line 204. On each attachment slice, such as attachment slice 504, the pop-up engine 122 identifies a location that is closest to the plane 202 and farthest from the folding line 204. The pop-up engine 122 marks each of the identified locations as attachment locations, where the base 502 attaches to the plane 202. In one embodiment, the pop-up engine 122 modifies each attachment slice to include a tab portion. When the attachment slices with the tab portions are manufactured, the tab portion slides into a slot that is cut into the physical pop-up card.

The vector outline of the popup model and associated parts are output to a file. The file includes a two-dimensional layout of the parts of the model in a manner that minimizes the number of stock pages. The resulting output file can be used to drive a 2D cutter, such as a numerical control (NC) laser, vinyl, or cardboard cutter.

Each attachment part and notch has printed labels that provide the neighboring relationship between attachment parts. Animations and step-by-step instructions are also outputted in order to assist a user in connecting attachment parts. The instructions and labels instruct the user as to how the attachment parts and/or tab portions are attached to base.

Figure 6B:
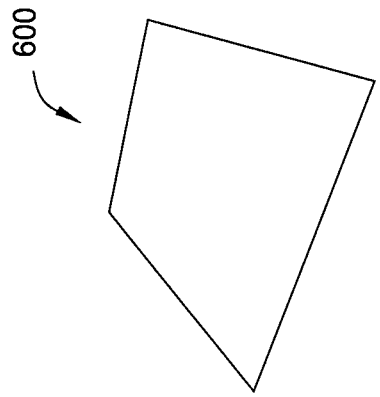
FIGS. 6A-6D illustrate a physical pop-up card with the attached 3D model being folded, according to one embodiment of the invention.
Figure 6D:
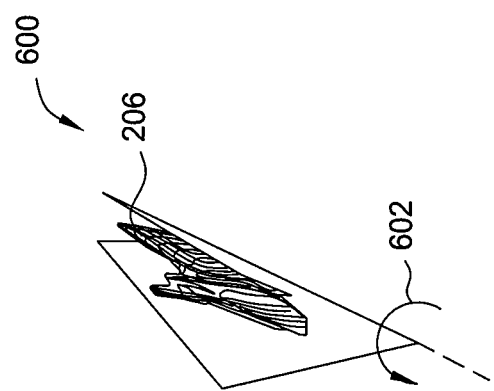
Figure 6A:
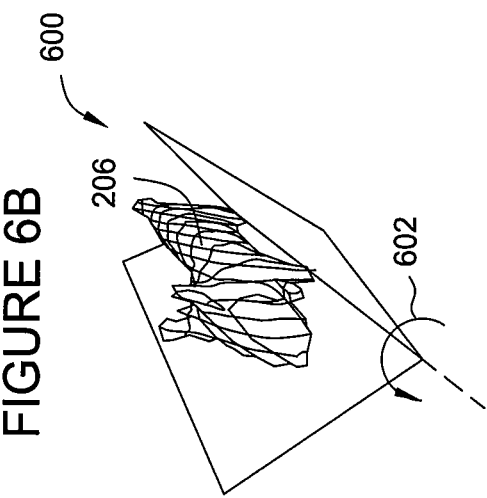
Figure 6C:
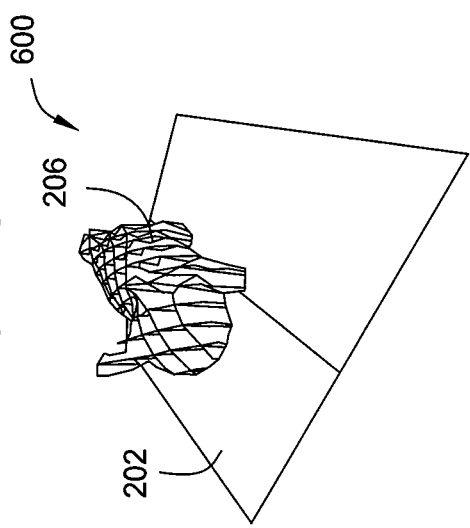

FIGS. 6A-6D illustrate a physical pop-up card 600 with the attached 3D model 206 being folded, according to one embodiment of the invention. As shown in FIG. 6A, the pop-up card 600 is in a completely open state such that the 3D model 206 is fully expanded. In FIG. 6B, the pop-up card 600, via the folding motion, transitions to a semi-folded state such that the 3D model 206 is slightly collapsed within the pop-up card 600. In FIG. 6C, the pop-up card 600, via the folding motion 602 transitions to a substantially folded state such that the 3D model 206 is substantially collapsed within the pop-up card 600. Finally, in FIG. 6D, the pop-up card 600 transitions to a completely folded state such that the 3D model 206 is completely collapsed within the pop-up card 600. In the completely folded state, the pop-up card 600 is essentially flat.

Figure 7:
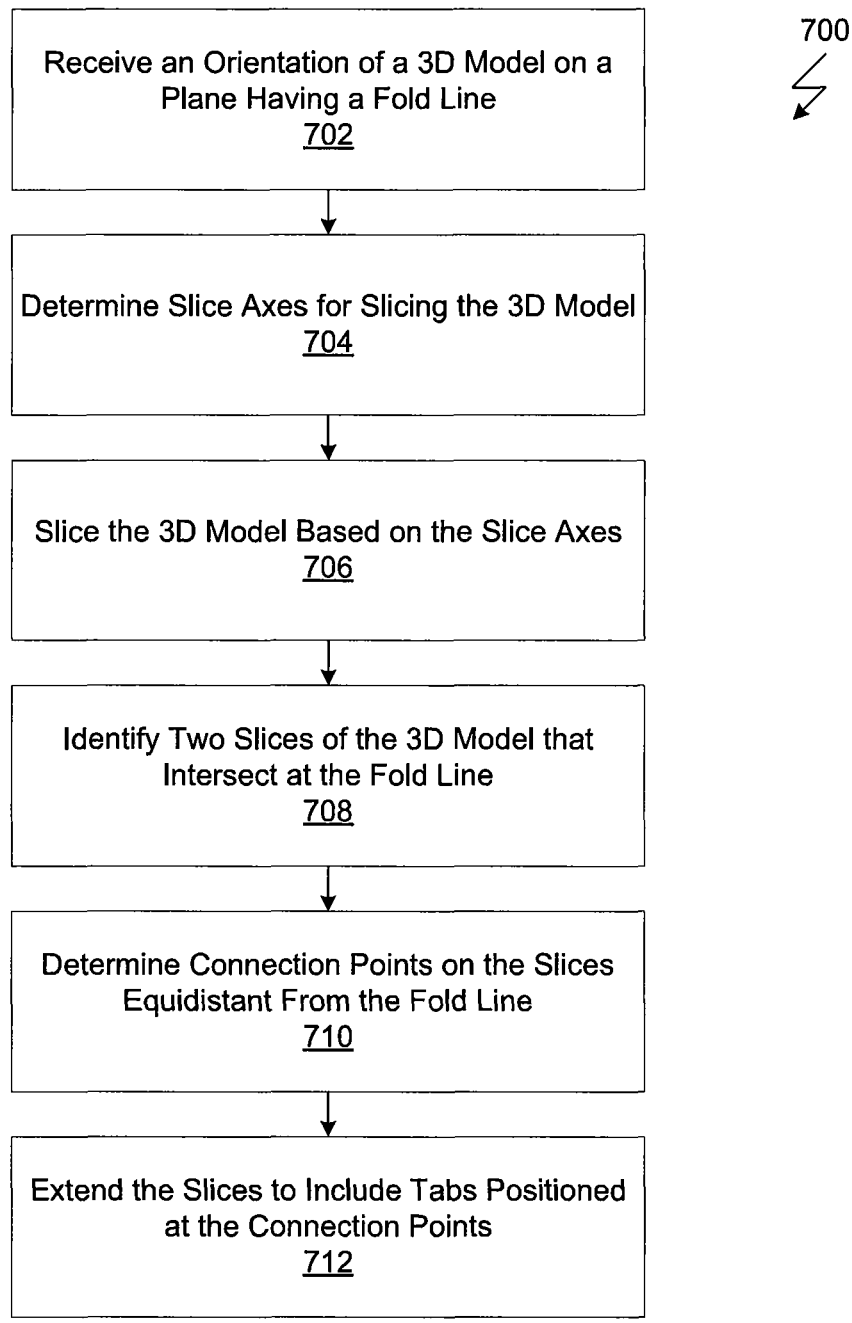
FIG. 7 is a flow diagram of method steps for generating a pop-up card based on a 3D model selected by a user, according to one embodiment of the invention.

FIG. 7 is a flow diagram of method steps for generating a pop-up card based on a 3D model selected by a user, according to one embodiment of the invention. Although the method steps are described in conjunction with the system for FIG. 1, persons skilled in the art will understand that any system configured to perform the method steps, in any order, is within the scope of the invention.

The method 700 begins at step 702, where the pop-up engine 122 determines an orientation of a 3D model to be attached to a plane surface having a fold line. In one embodiment, the pop-up engine 122 determines the orientation based on a user-selected orientation of the 3D model on the plane surface. In alternative embodiments, the pop-up engine determines the orientation of the 3D model on the plane surface based on the size of the 3D model and the location of the folding line.

At step 704, the pop-up engine 122 then determines one or more axes along which the 3D model is to be sliced. In one embodiment, the user provides the axes along which the 3D model is to be sliced. In alternative embodiments, the pop-up engine 122 computes the axes along which the 3D model is to be sliced based on the orientation of the 3D model on the plane surface. Once the set of slice axes are determined, the pop-up engine 122 transmits the 3D model and the set of slice axes to the slicing engine 120. At step 706, the slicing engine 120 slices the 3D model based on the set of slice axes to generate a set of slices associated with the 3D model. Each slice associated with the 3D model connects to at least one other slice to reconstruct the 3D model.

At step 708, the pop-up engine 122 identifies two attachment slices of the 3D model 206 that intersect at the fold line of the plane surface selected at step 702. At step 710, the pop-up engine 122 identifies a location on each attachment slice that is closest to the plane 202 and farthest from the folding line 204. At step 712, the pop-up engine 122 extends the attachment slice to include a tab positioned at the identified location. When the attachment slices with the tab portions are manufactured, the tab portion slides into a slot that is cut into the physical pop-up card.

In sum, a pop-up engine processes a sliced 3D model to identify locations where the sliced 3D model is to attach to a plane surface of a pop-up card. For a given set of slices associated with a sliced 3D model, the pop-up engine identifies at least two slices that intersect at a folding line of the plane surface. The pop-up engine then identifies locations on the slices that are the farthest from the folding line. The pop-up engine marks the identified locations as connection points, where the 3D model is to attach to the plane surface.

One advantage of the disclosed techniques is that, given a 3D model, the structure of a pop-up card that includes that 3D model is automatically determined. Pop-up cards can, thus, be designed and produced efficiently.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A computer-implemented method for manufacturing a physical pop-up card based on a three-dimensional (3D) graphics model, the method comprising:
   receiving an orientation of the 3D graphics model on a plane surface having a fold line along which the plane surface folds;
   slicing the 3D graphics model along at least two slice axes to generate a plurality of slices; and
   generating an output file that includes a two-dimensional layout of the plurality of slices by:
      identifying a first slice included in the plurality of slices that intersects a second slice included in the plurality of slices at the fold line, wherein the first slice is diagonal to the fold line;
      identifying a connection location along the first slice where the first slice is to attach to the plane surface; and
      causing an indication of the connection location to be generated on the first slice,
   wherein the physical pop-up card is manufactured based on the output file.

2. The method of claim 1, further comprising orienting, based on the orientation included in a set of slicing parameters, the 3D graphics model on the fold line.

3. The method of claim 2, further comprising determining that the 3D graphics model should be sliced along the at least two slice axes based on the orientation of the 3D graphics model on the plane surface.

4. The method of claim 2, wherein each slice axis included in the at least two slice axes is diagonal to the fold line.

5. The method of claim 1, wherein identifying the connection location comprises identifying a location along the first slice that is farthest from the fold line.

6. The method of claim 5, further comprising identifying a second connection location along the second slice where the second slice is to attach to the plane surface.

7. The method of claim 6, wherein the connection location and the second connection location are equidistant from the fold line.

8. The method of claim 1, further comprising extending the first slice to include a tab portion positioned at the connection location.

9. The method of claim 8, further comprising:
identifying a surface connect location on the plane surface where the tab portion slides into the plane surface; and
causing the indication of the connection location to specify that the tab portion is to be positioned at the surface connect location.

10. One or more non-transitory computer readable media storing instructions that, when executed by one or more processors, cause the one or more processors to generate a physical pop-up card for manufacture based on a three-dimensional (3D) graphics model by performing the steps of:
receiving an orientation of the 3D graphics model on a plane surface having a fold line along which the plane surface folds;
slicing the 3D graphics model along at least two slice axes to generate a plurality of slices; and
generating an output file that includes a two-dimensional layout of the plurality of slices by:
identifying a first slice included in the plurality of slices that intersects a second slice included in the plurality of slices at the fold line, wherein the first slice is diagonal to the fold line;
identifying a connection location along the first slice where the first slice is to attach to the plane surface; and
causing an indication of the connection location to be generated on the first slice,
wherein the physical pop-up card is manufactured based on the output file.

11. The one or more non-transitory computer readable media of claim 10, further comprising instructions that, when executed by the one or more processors, cause the one or more processors to perform the step of orienting, based on the orientation included in a set of slicing parameters, the 3D graphics model on the fold line.

12. The one or more non-transitory computer readable media of claim 11, further comprising instructions that, when executed by the one or more processors, cause the one or more processors to perform the step of determining that the 3D graphics model should be sliced along the at least two slice axes based on the orientation of the 3D graphics model on the plane surface.

13. The one or more non-transitory computer readable media of claim 11, wherein each slice axis included in the at least two slice axes is diagonal to the fold line.

14. The one or more non-transitory computer readable media of claim 10, wherein identifying the connection location comprises identifying a location along the first slice that is farthest from the fold line.

15. The one or more non-transitory computer readable media of claim 14, further comprising identifying a second connection location along the second slice where the second slice is to attach to the plane surface.

16. The one or more non-transitory computer readable media of claim 15, wherein the connection location and the second connection location are equidistant from the fold line.

17. The one or more non-transitory computer readable media of claim 10, further comprising instructions that, when executed by the one or more processors, cause the one or more processors to perform the step of extending the first slice to include a tab portion positioned at the connection location.

18. The one or more non-transitory computer readable media of claim 17, further comprising instructions that, when executed by the one or more processors, cause the one or more processors to perform the steps of:
identifying a surface connect location on the plane surface where the tab portion slides into the plane surface; and
causing the indication of the connection location to specify that the tab portion is to be positioned at the surface connect location.

19. A computer system, comprising:
one or more memories; and
one or more processors, coupled to the one or more memories, that:
receives an orientation of the 3D graphics model on a plane surface having a fold line along which the plane surface folds,
slice the 3D graphics model along at least two slice axes to generate a plurality of slices, and
generate an output file that includes a two-dimensional layout of the plurality of slices by:
identifying a first slice included in the plurality of slices that intersects a second slice included in the plurality of slices at the fold line, wherein the first slice is diagonal to the fold line,
identifying a connection location along the first slice where the first slice is to attach to the plane surface, and
causing an indication of the connection location to be generated on the first slice,
wherein the physical pop-up card is manufactured based on the output file.

20. The computer system of claim 19, wherein the processor further orients, based on the orientation included in a set of slicing parameters, the 3D graphics model on the fold line.

21. The one or more non-transitory computer readable media of claim 10, wherein the first slice includes at least one slot for coupling the first slice to the second slice.

22. The one or more non-transitory computer readable media of claim 10, wherein the first slice and the second slice are separate and distinct slices, and the two-dimensional layout includes the first slice and the second slice on different pages.

* * * * *

UNITED STATES PATENT AND TRADEMARK OFFICE
CERTIFICATE OF CORRECTION

PATENT NO. : 10,762,705 B2
APPLICATION NO. : 13/740093
DATED : September 1, 2020
INVENTOR(S) : Jonathan Bachrach and Saul Griffith Page 1 of 1

It is certified that error appears in the above-identified patent and that said Letters Patent is hereby corrected as shown below:

On the Title Page

(72) Inventors:
Please delete "Johnathan Bachrach" and insert --Jonathan Bachrach--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*